UNITED STATES PATENT OFFICE.

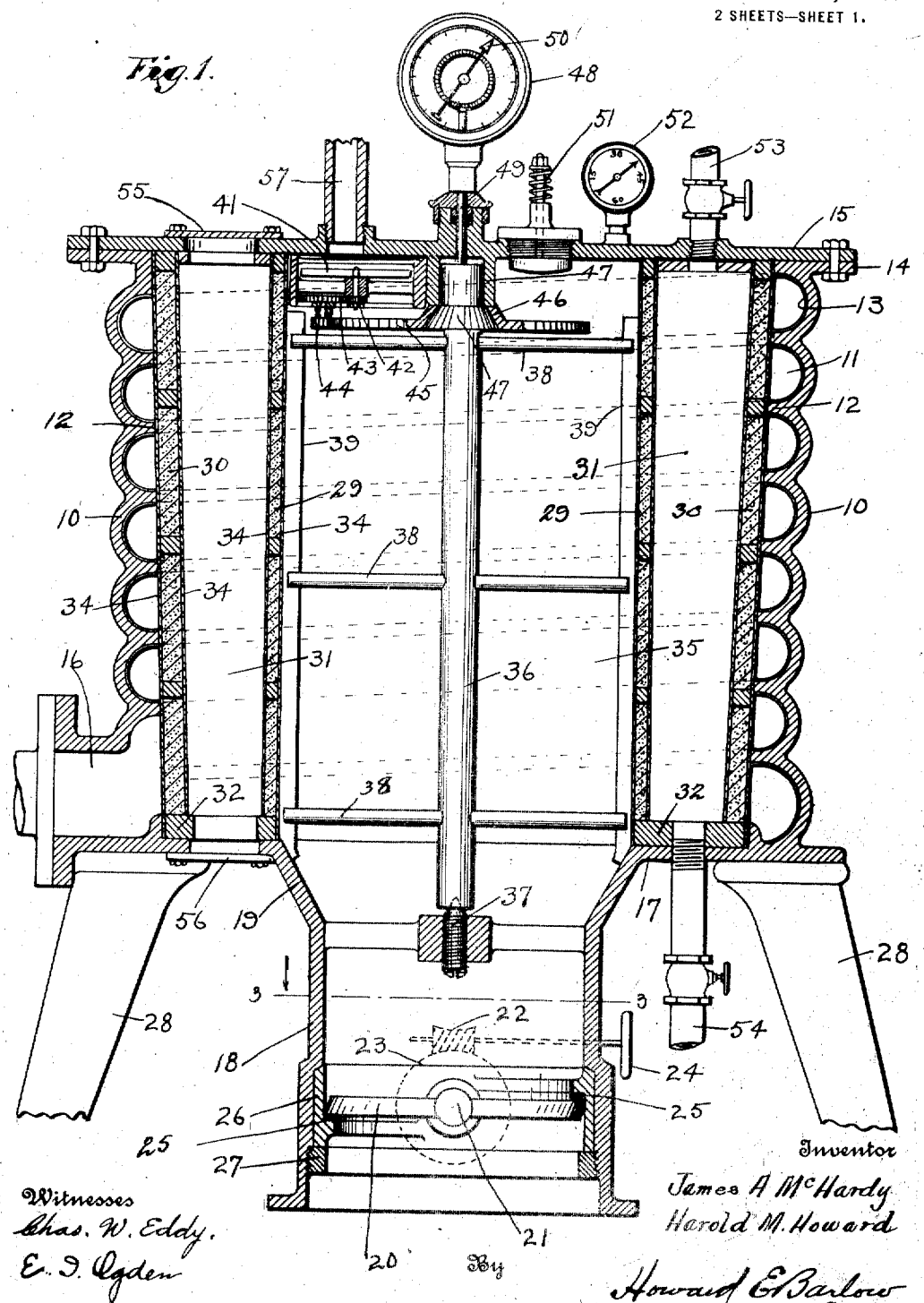

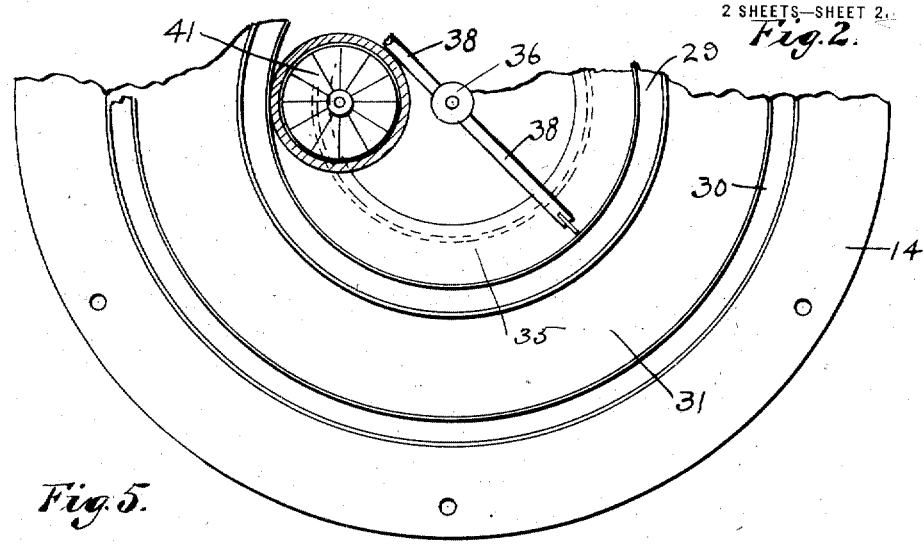

JAMES A. McHARDY AND HAROLD M. HOWARD, OF PROVIDENCE, RHODE ISLAND.

FILTER.

1,247,979.   Specification of Letters Patent.   Patented Nov. 27, 1917.

Application filed September 15, 1913. Serial No. 789,783.

*To all whom it may concern:*

Be it known that we, JAMES A. MCHARDY and HAROLD M. HOWARD, citizens of the United States, and residents of the city of Providence, in the county of Providence and State of Rhode Island, have invented certain new and useful Improvements in Filters, of which the following is a specification.

This invention relates to a filtering device for separating material held in fluids both as a mixture and also in solution, and has for its object to provide a filter of this class that is provided with a central chamber for receiving the fluid to be filtered under pressure. A filtering wall of suitable porous material is placed about said chamber for holding back and separating the particles mixed with the fluid as the latter passes therethrough, and a second chamber being located outside of said first filter wall containing a chemical or reagent through which the fluid next passes, the chemical acting upon the fluid to coagulate the material held in solution, and a second filter wall being located around said chemical chamber for holding back and removing the coagulant as the fluid passes through, and a third or outer chamber is provided for receiving and collecting the fluid thus filtered and freed from objectionable matter.

It is often found in practice desirable to filter fluids that have material held therein, both as a mixture and in solution, such for example as dirty soapy water used in a laundry. When such a fluid is passed through our improved filter the first wall prevents the passage of the dirt and lint mixed with the water, the second chamber, which may in this case be filled with sodium chlorid, coagulates the soap held in solution, and the second porous wall prevents the passage of these solidified soapy particles, and the clear water freed from all of the objectionable material issues into the outer chamber and is conducted away through the outlet to be used again, the above being but one of many instances in which such a filter may be employed.

A further object of this invention is to provide a rotatable scraper for cleaning the inner filter wall and to provide means whereby said cleaning means is driven by friction, said friction being set so that the cleaner will cease to rotate when an excess of sediment has collected and requires removal.

A further object of the invention is the provision of a sediment chamber below the main receiving chamber into which the matter separated from the water by the first filtering process falls by gravity, the same being provided with a dumping gate through which this foreign matter may be expelled.

A still further object of the invention is to provide a motor actuated by the inflowing pressure for rotating the cleaning device.

The invention further consists in the provision of an indicator to show the rotation of the cleaner, so that when the same ceases to revolve it is known that the sediment chamber is full requiring its contents to be at once removed.

With these and other objects in view, the invention consists of certain novel features of construction, as will be more fully described and particularly pointed out in the appended claims.

Of the accompanying drawings:

Figure 1— is a central sectional elevation through our improved filtering apparatus.

Fig. 2— is a plan view of a portion of the filter with the cover removed.

Fig. 3— is a sectional view through the sediment chamber on line 3—3 of Fig. 1.

Fig. 4— is an enlarged view showing a portion of the wall web into the apertures of which the porous filtering material is set.

Fig. 5— is a view showing a portion of the thin perforated sheet material with which the porous filter walls are lined.

Fig. 6— is an enlarged view illustrating one of the scraper carrying arms in which the scraper block is yieldably mounted.

Fig. 7— is a sectional view of a multiple cartridge, of reduced size, containing a plurality of chemical chambers.

Referring to the drawings, our improved filter is constructed essentially of an outer circularly corrugated shell 10, said corrugations being in a helical form providing an annular helical groove or chamber 11 extending from the top a plurality of times around the body portion to the bottom thereof, the walls 12 between these recesses forming circular ribs for stiffening the structure and supporting the porous filtering walls against the internal pressure.

This annular chamber 11 is preferably lined at 13 with lead, or other suitable material, to protect the iron of which it is formed, from the deteriorating action of the fluids passing through the filter. The upper edge of this outer wall is flanged as at 14 to which a cover 15 is bolted, and the lower portion of this wall is provided with an outlet 16 through which the filtered water passes.

Extending downwardly from the bottom portion 17 of this outer wall is a neck portion 18 providing a chamber into which the sediment separated from the water falls by gravity, the upper end of this chamber being provided with a flaring mouth 19 to facilitate the passage of the sediment thereinto. At the lower end of the chamber is mounted a gate 20 pivotally supported on the shaft 21, the same being adapted to be rotated through the medium of the worm 22 and worm gear 23 by the handle 24 for the purpose of dumping the contents of the chamber, the opposite edges of the gate being arranged to close against packing seats 25, the whole being mounted in a removable collar 26 held in position in said neck by the threaded ring 27. The whole filter is supported on suitable legs or standards 28.

The inner and outer walls 29 and 30 are each preferably formed of cast iron of an open basket work construction similar to that illustrated in Fig. 4, both of said walls being in a circular form. The inner wall 29 is of considerable less diameter than the outer wall leaving a space or chamber 31 between them, and the lower edges of these walls are connected together through the tying bottom plate 32, thereby forming substantially a double walled tube or cartridge, the outer surface of the outer wall being preferably set on a slight angle so that the cartridge may be more readily inserted into and removed from the outer grooved casing 10.

In preparing these walls 29 and 30 all of the apertures 33, see Fig. 4, are filled with a suitable porous material, such as plaster-of-Paris, or other analogous substance before being inserted into the casing, and to protect this filtering material while in said walls I preferably line each on both sides with suitable perforated metal tubes or sheets 34, but the employment of these linings is not necessarily essential to the practical operation of the filter. By forming these filtering walls of tubular shape, a central chamber 35 is provided into which the fluid to be filtered is passed through the inlet pipe 57, and in order to scrape and clean the inner circular wall of the filter we have provided an upright central shaft 36 which is supported from its lower end on an adjustable center 37. Said shaft is provided with laterally extending arms 38 in which wooden scrapers 39 are preferably set edgewise, the same being normally pressed outward against the inner surface by means of springs 40, see Fig. 6, so as to readily accommodate themselves to any unevennesses in the wall of the cylinder and also automatically compensate for wear. In order to rotate this scraping device we have mounted a motor 41, which may be of the turbine or other well-known or suitable type, below the inlet pipe 57, whereby the inflowing water under pressure is obliged to pass through and actuate this motor, the rotation of which through pinion 42, small gear 43, pinion 44 and large gear 45 rotates the shaft 36. This large gear, however, instead of being fixed permanently to the shaft is provided with a conical opening in its hub 46 which fits onto a correspondingly shaped boss 47 on the shaft 36. The upper edge of this gear hub 46 rotates against the fixed downwardly extending hub 47 by which construction it will be seen that when this boss is forced upward into the gear hub the shaft 36 is driven by frictional contact only, the effect or extent of which frictional contact is arranged to be nicely regulated by a vertical adjustment of the center supporting screw 37 at the lower end of said shaft.

In order to be able to determine whether or not the shaft is being rotated and the scrapers operating, an indicating dial 48 is mounted in plain sight above the casing and is connected to the shaft 36 through the rod 49 so that the rotation of the shaft would cause the pointer 50 to revolve. In order to facilitate the quick dumping of the material we have provided an automatic relief air valve 51, which is normally held in closed position by means of the internal pressure and the spring 51, whereby when it is desired to drop the contents of the sediment chamber, this valve will automatically open to break the vacuum which may be caused by a quick outflow of material.

A pressure gage 52 is also connected to the inner chamber to indicate the pressure therein under which the material is operating.

When liquid chemicals are used in the chamber 31 they may be readily supplied through the inlet pipe 53 and as readily drawn off through the exhaust pipe 54, but when solids or dry chemicals are used in this chamber they may be inserted through the man-hole 55 and removed through the lower man-hole 56.

The operation of our improved filter may be more fully described as follows:

The fluid to be filtered is passed under pressure through the inlet pipe 57, and through the motor 41 into the inner or central chamber 35. The latter is actuated to rotate the scraping arms 39 for the purpose of removing the sediment from the walls, and causing it to fall by gravity into the sediment chamber below, and as the water passes through the first wall of porous material it is freed from foreign matter mixed therewith and enters the chemical chamber 31 where it is acted upon by the reagent therein contained causing the substances held in solution to coagulate. The liquid then passes through the second wall leaving the coagulant in the chemical chamber and issues into the outer chamber free and clear from the objectionable material originally held therein, both as a mixture and in solution. By filtering and cleaning the fluid before permitting it to enter and to be acted upon by the chemicals in the second chamber it is freed from all foreign matter and the chemicals are thereby conserved and last much longer.

When the sediment in the first chamber fills the sediment receptacle below to such a height that the ends of the scrapers extend therein and are clogged, then these scrapers cease to rotate and the gear 45 slips on its friction bearing hub 47. The stopping of these scrapers is shown by the indicator pointer 50 thereby notifying the attendant that the sediment chamber should be dumped, which dumping and cleaning may be accomplished without interfering with the inflow of water and with but the loss of a few seconds of time and a minimum waste of water.

The contents of the chemical chamber may be readily changed, when in liquid form, through the inlet and outlet pipes 53 and 54, and when in solid form, such as salts or the like, through the upper and lower man-holes 55 and 56.

In some instances where it is desired to apply a number of chemicals to the fluid as it passes through the filter we have provided a multiple cartridge as illustrated in Fig. 7, in which there is an inner wall 58, an outer wall 59, and an intermediate wall 60, thereby providing an inner chemical chamber 61 and a second chemical chamber 62, but a cartridge containing any number of chemical chambers and porous filtering walls may be employed in our improved filter.

We do not wish to be restricted to the exact construction as herein shown and described as the filter may be constructed with one or more chemical chambers through which the liquid is obliged to pass successively for the purpose of applying compound chemistry and removing different substances from the fluid by the successive actions of these different chemicals. The broad idea of our invention being the arrangement of a filter of a unitary structure comprising one or more bodies of porous filtering material and one or more bodies of chemicals or reagents through which the fluid must pass successively on its way through the filter, and any construction which will perform this combined filtering and chemical action upon the fluid will fall within the spirit and scope of our invention.

We claim:

1. A filter for mixtures and solutions comprising a body of chemical surrounding a central chamber, a surrounding body of filtering material, through both of which bodies the fluid to be filtered passes, and means for introducing unfiltered fluid into said chamber.

2. A filter for mixtures and solutions comprising spaced apart concentric bodies of porous filtering material of different diameters, and a body of chemical interposed between the bodies of filtering material, through all of which the fluid to be filtered passes.

3. A filter of the character described comprising a fluid pressure chamber, spaced apart filtering walls surrounding said chamber and provided between them with a chemical containing chamber, and means for receiving the filtered fluid after passing through said chambers.

4. A filter of the character described comprising a fluid pressure chamber, spaced apart filtering walls surrounding said chamber and provided between them with a chemical containing chamber, and a channel surrounding the outer filtering wall to receive the filtered fluid.

5. A filter for mixtures and solutions comprising a central chamber for receiving the fluid under pressure, a first filtering wall, an intermediate chemical or reagent containing chamber, a second filtering wall and an outer chamber for receiving the fluid after being subjected to a combined filtering and chemical action.

6. A filter comprising an outer casing having a readily removable cartridge mounted therein, said cartridge comprising a plurality of filtering walls, and one or more chemical containing chambers through all of which the fluid to be filtered passes.

7. A filter comprising an outer casing having a readily removable cartridge mounted therein, said cartridge comprising a plurality of spaced apart filtering walls, forming between them one or more chemical containing chambers through all of which the fluid to be filtered passes.

8. A filter comprising an outer casing having a readily removable cartridge mounted therein, said cartridge comprising a plurality of cylindrical spaced apart filtering walls forming between them one or more chemical containing chambers through all of which the fluid to be filtered passes.

9. A filter comprising an outer casing having a readily removable cartridge mounted therein, said cartridge comprising a plurality of walls of open work construction the openings therein being filled with porous filtering material, said walls being spaced apart forming one or more chemical chambers through all of which the fluid to be filtered passes.

10. A filter comprising an inner chamber for receiving unfiltered fluid under pressure, a first filtering wall inclosing said chamber, a second filtering wall spaced from and inclosing said first wall to provide a chamber between the walls, a chemical or reagent within the last mentioned chamber and an outer wall spaced apart from the second filtering wall to form a chamber for receiving the filtered fluid.

11. A filter of the character described comprising a casing, and a removable cartridge mounted therein, said cartridge comprising a plurality of spaced apart filtering walls inclosed one within the other through all of which the fluid to be filtered must pass, said casing being provided with a channel surrounding said cartridge to receive the filtered fluid.

In testimony whereof we affix our signatures in presence of two witnesses.

JAMES A. McHARDY.
HAROLD M. HOWARD.

Witnesses:
Howard E. Barlow,
E. I. Ogden.